Figure 1:
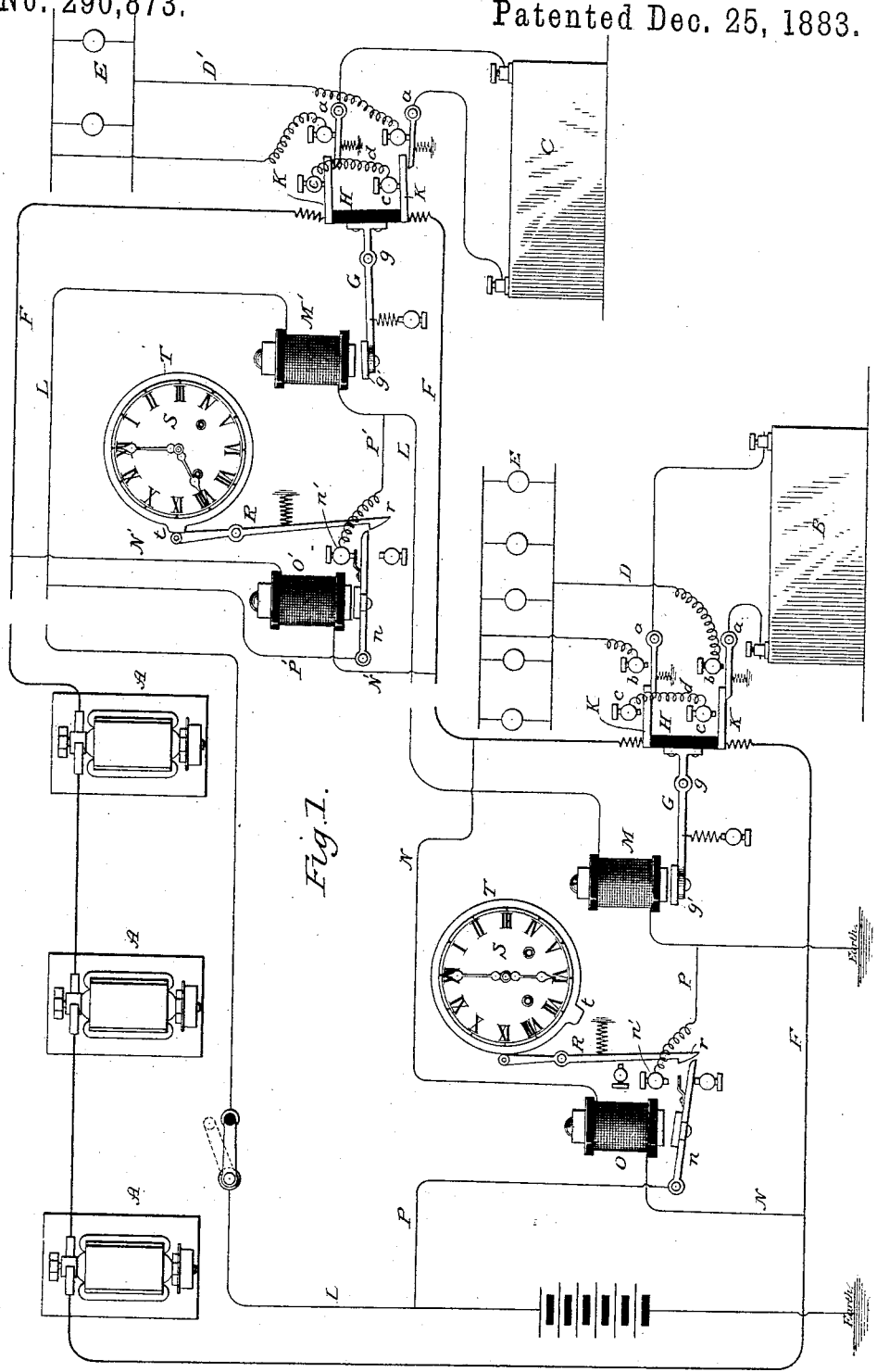

(No Model.)

M. G. FARMER.
SYSTEM OF ELECTRICAL GENERATION AND DISTRIBUTION.

No. 290,873.  Patented Dec. 25, 1883.

2 Sheets—Sheet 2.

Attest:
Raymond F. Barnes.
W. Frisby.

Inventor:
Moses G. Farmer
By Parker W. Page
atty

UNITED STATES PATENT OFFICE.

MOSES G. FARMER, OF NEWPORT, RHODE ISLAND.

SYSTEM OF ELECTRICAL GENERATION AND DISTRIBUTION.

SPECIFICATION forming part of Letters Patent No. 290,872, dated December 25, 1883.

Application filed June 5, 1883. (No model.)

*To all whom it may concern:*

Be it known that I, MOSES G. FARMER, a citizen of the United States, and a resident of Newport, in the county of Newport and State of Rhode Island, have invented certain new and useful Improvements in Systems of Electrical Generation and Distribution, of which the following is a specification, reference being had to the drawings accompanying and forming a part of the same.

My invention relates to electrical systems involving the use of secondary or storage batteries, by means of which electrical currents may be economically produced, stored, and utilized for the production of light, power, or other analogous and useful purposes.

It is well known that the secondary or storage batteries with which my invention is concerned are practically applicable, when properly constructed and charged, to the same purposes as those for which ordinary batteries are or may be employed. It is, however, necessary to charge them repeatedly from some source of electricity—such as a dynamo-electric machine—and as they are capable of receiving a comparatively limited charge only, and one which is soon expended, the operations of recharging, when the batteries are much used, are necessarily frequent.

When secondary batteries are used on a large scale, as for general purposes of illumination, it is very desirable that provision be made for charging all the independently-located groups of cells from one or more permanent sources of electrical supply, since the size and weight of the batteries render it impracticable to transport them to and from the points where they are used and where they may be charged.

In another application I have shown and described a system for charging isolated or independent groups of batteries from a main or central station and for connecting or disconnecting them with the charging-circuit, the general and most prominent features of such system being as follows: A main or charging circuit extends from a central source of supply, at which are located electrical generators. This circuit is carried from point to point, where are located the groups of batteries. In conjunction with each battery is used a key or lever, which, when moved, encounters certain stops or contacts. In one position it causes the current in the main circuit to flow through the battery, and thus charge it, and at the same time it cuts off the circuit which is supplied by the battery when charged. In another position it shunts the charging-current around the battery and brings in the local or battery circuit. These movements are imparted to the keys by means of electro-magnets included in an independent circuit running parallel with the charging-circuit. By passing a current through this independent or controlling circuit the keys are operated by their respective magnets and bring into the charging-circuits all the batteries. When the current has been passed through these latter for a proper length of time, the current in the controlling-circuit is interrupted, which disconnects the batteries from the charging-circuit. In addition to these devices I have also described means for automatically disconnecting the batteries from the charging-circuit when they have acquired a predetermined charge, such devices consisting, in the main, of electro-magnets in shunt or derived circuits from the charging-circuit around each battery and armatures controlled thereby, and operating directly or by intermediate mechanism to disconnect the batteries from the charging-circuit when their counter electro-motive force has increased sufficiently to produce a certain degree of attraction in the shunt-magnets by the diversion of current through the shunt-circuits. To this system and appliances my present invention chiefly relates, the subject of the invention being the combination, with the shunt-magnet cut-out mechanism, of devices for rendering it more effective and better adapted for large systems.

Figure 2:
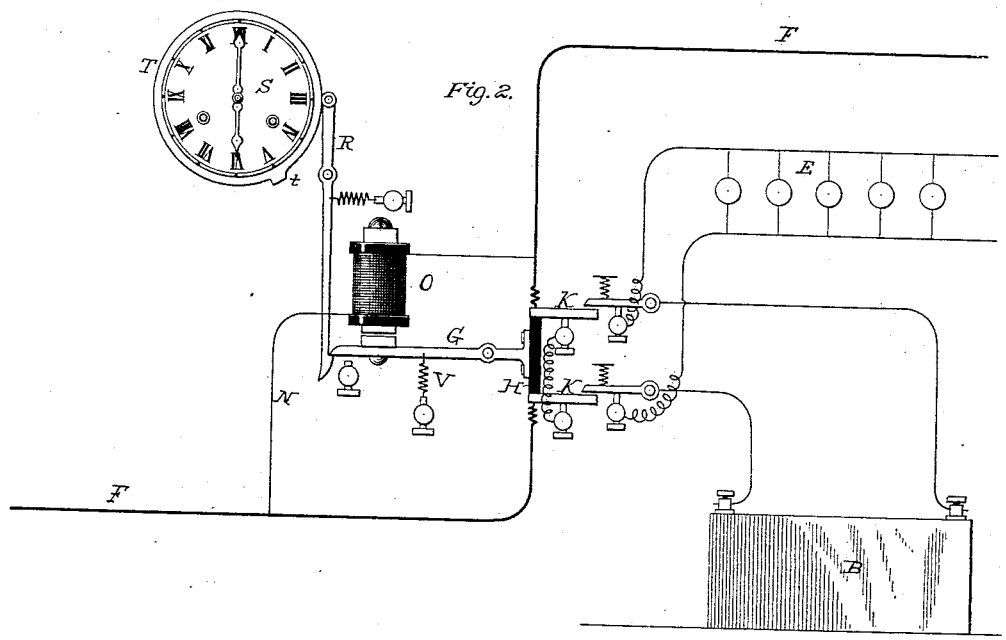

The nature and purpose of the invention will be explained by reference to the annexed drawings, which illustrate in Figure 1 a portion of a system with my invention applied thereto, and in Figs. 2 and 3 modifications of the devices invented by me.

Let A A A designate a number of machines or any suitable source of current located at a given point, and B C a number of secondary batteries or groups of cells located at certain other points. With each battery B C is arranged a circuit, D D', in which circuits are included electric lamps E or any other electrical devices.

F F is a circuit from the generators A around to all the batteries of the system. To charge the batteries in the most economical manner they are connected in series with this circuit. To connect them I use any suitable form of switch mechanism, of which that shown in the drawings is given as a specimen.

G is an ordinary lever, turning on a fulcrum, $g$.

H is a bar of insulating material secured to the lever G, and K K are metallic arms secured to the ends of bar H.

In the path of movement of arms K are spring contact-arms $a\,a$, connected by conductors to the opposite terminals of the battery. Contact-stops $b\,b$ in the path of the arms $a$ form the terminals of the local or battery circuit D, and similar stops, $c\,c$, in the path of arms K are connected by a conductor, $d$. When the lever G is turned in one direction, the arms K rest upon the stops $c$, and are out of contact with the arms $a$. These latter then bear on stops $b\,b$. When the position of lever G is reversed, arms K are out of contact with stops $c\,c$ and in contact with arms $a\,a$, while these latter are forced away from stops $b\,b$. If, therefore, the circuit F be severed at each battery and connected with the opposite arms, K K, it is evident that the circuit will be completed, either through the batteries or the stops $c\,c$ and wire $d$, according to the position of the levers G. In order to effect these changes in position and at the proper times, I run an independent circuit, L L, from the station or from any other convenient point, around to all the batteries, and in this circuit I include electro-magnets M M'.

On the levers G are armatures $g'$, which are acted on by the electro-magnets M M'. When the magnets are active, the armatures are drawn up, and the circuit F formed through instead of round the batteries.

N N' are circuits of high resistance, including magnets O O'. The circuits N N' are taken off from the main circuit on opposite sides of the mechanism that directs the current through or around the batteries, so that the proportion of current that flows through them will be determined by the resistance or counter electromotive force of the batteries to which they form derived circuits. It is well known that this resistance or opposition to the flow of current is greater as the battery approaches saturation, so that the magnets O O' may be so constructed or their armatures so adjusted that they will be operated only when the battery has received a predetermined charge.

Around the magnets M M', I form normally-open short circuits P P', and in these circuits I include circuit-closers that are operated by the magnets O O'. A simple armature-lever, $n$, connected to one part of the circuit, and a contact-stop, $n'$, connected to the other, will answer for this purpose.

The operation of these devices is as follows: When the batteries B C are to be charged, the circuit L L is closed, whereby the levers G, assuming that at this time the armature-levers $n$ are not in a position to short-circuit the magnets M M', are brought into a position to connect the batteries in series with the charging-circuit. After the charging has proceeded for a certain time, supposing that one of the batteries, as C, approaches the condition of saturation, the resistance which it opposes diverts sufficient current through the circuit N' to energize the magnet O' to such a degree that it draws up its armature and short-circuits the magnet M'. In consequence of this the battery is disconnected from the line F.

To prevent the armature-lever $n$ from falling away from the magnet O' when the battery C is disconnected, I use some device to retain it in contact with the stop $n'$. This may be a simple spring-lever, R, with a catch, $r$, which engages with the lever $n$ when the latter is raised. The battery C remains disconnected from the charging-circuit as long as the magnet M' is inactive; but in order to bring the magnet M' to an active condition again the short circuit N' must be broken. To effect this I employ a clock mechanism of any suitable construction to release the catch $r$ at determined intervals. For this purpose a disk, T, with a cam, $t$, or a simple arm, may be fixed to or geared with the hour-spindle of any ordinary clock, S, and placed in such a position that at any given hour—say eight o'clock—it will shift the lever R and drop the armature-lever $n$. With such an arrangement the batteries may be charged during the day or night at any time after eight o'clock. When so desired, the tripping mechanism may be caused to operate with greater or less frequency in many well-understood ways.

Having now described devices of a specific character for accomplishing the desired objects, it remains to point out wherein the same may be modified without departure from the invention, and also to indicate the general features of novelty involved in the system.

As stated above, the mechanical construction of the circuit-shifting mechanism, comprising, in the main, the lever G, arms K K, and the contact-stops, may be supplanted by any other mechanism for accomplishing the same objects; secondly, instead of using electro-magnets M M' and O O' and their appurtenances for effecting the requisite changes in the position of this mechanism, I may employ a spring acting in conjunction with the lever G to keep the batteries in the charging-circuit, and use the magnets O O' or other means, the operation of which depends upon the attainment of a certain degree of saturation of the batteries, to draw down the lever G against such spring, the locking device or catch and its releasing clock mechanism in this event being used for retaining the lever G in the position to which it is brought by the magnets O O' until such time as it may be desired to again charge the batteries. This arrangement is shown in Fig. 2, which represents a portion of the charging-circuit and a battery.

To the lever G is attached a spring, V, and the contact-stops and connections are so arranged that this spring maintains the battery B in the charging-circuit.

Opposed to the spring V is a magnet, O, in a shunt from the charging-circuit around the battery, and a locking-lever, R, with a clock mechanism, is also employed, as in the former instances described. With this arrangement, when the battery has received a given charge, the magnet O draws up the lever G and diverts the charging-current around the battery. The lever G will be held in its raised position by the lever R until it is released by the lug $t$ on the clock.

Again, with reference to the clock mechanism, it is evident that not only may its specific construction be greatly varied, but that it may be replaced by any other equivalent releasing device—for instance, an electro-magnet—or the releasing devices may be entirely dispensed with and the armatures of the magnets O O' released by hand.

Figure 3:
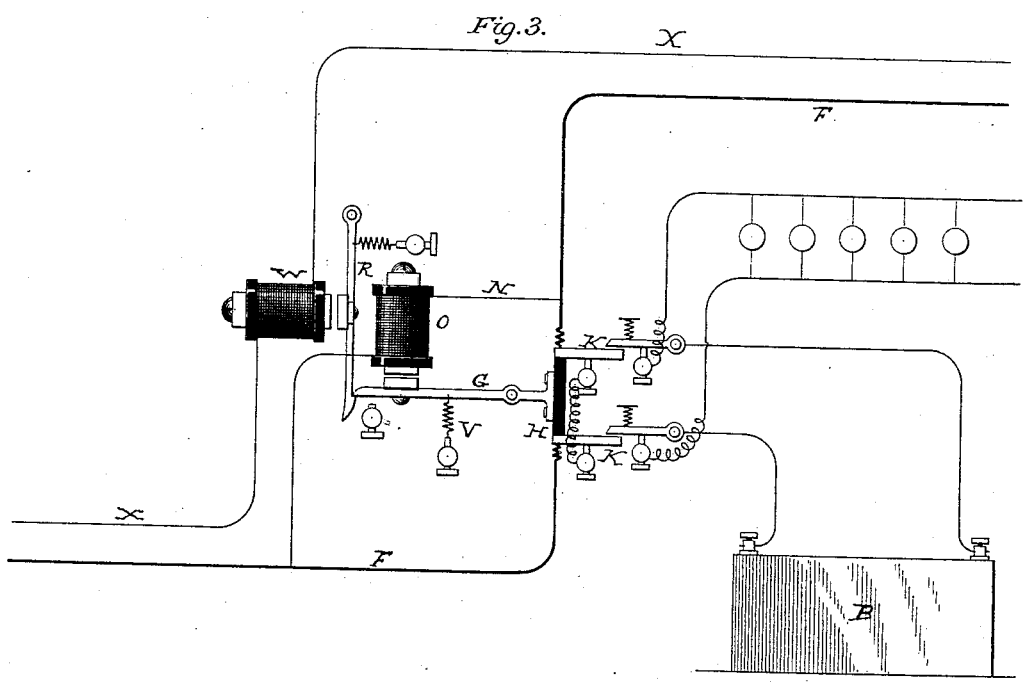

In Fig. 3 is shown an electro-magnet, W, in an independent circuit, which is designed to run to all the batteries. This circuit may be completed or interrupted at any point. When the batteries have been cut out from the charging-circuit by the magnets O O', by either of the arrangements above described, they remain so, owing to the locking-levers R. When it is desired to bring them into the charging-circuit again, the circuit X is closed, the magnet W energized, the levers R drawn back, and the levers G released.

Having now described the nature and objects of my invention, what I claim, without relinquishing the right of claiming in other applications features of novelty herein shown or described but not claimed, is—

1. The combination, with one or more generators a charging-circuit, and a secondary battery, of an automatic switch or circuit-shifter, operating upon the reception by the battery of a given charge, to disconnect it from the charging-circuit, means for locking or retaining the switch and preventing its reaction, and means for releasing the same, as and for the purpose specified.

2. The combination, with one or more generators, a charging-circuit, and secondary batteries located along the line of the same, of automatic switch mechanisms, operating upon the reception by the batteries of a given charge, to disconnect them from the circuit, means for locking or preventing the reaction of the switches, and releasing mechanisms, all substantially as herein set forth.

3. The combination, with a generator, a charging-circuit, and secondary batteries located along the line of the same, of closed shunts from the charging-circuit around each battery, electro-magnetic switch mechanisms included in said shunts, retaining or locking mechanism for preventing the reaction of the switches, and releasing mechanism, all substantially as herein described.

4. The combination, with a generator, a charging-circuit, and secondary batteries located along the line of the same, of closed shunts from the charging-circuit around each battery, devices included therein for disconnecting the batteries from the charging-circuit when charged, locking mechanism for preventing the reaction of the said devices, and clock or time mechanism for releasing the same, all as set forth.

5. The combination, with the generators A A, the circuit F, secondary batteries B C, and circuits D D', of the circuit L, devices therein for controlling the circuit F by directing it through or around the batteries, derived circuits N N', of high resistance, devices therein for short-circuiting the controlling devices when the batteries are charged, retaining devices, and releasing devices, all substantially as set forth.

In testimony whereof I have hereunto set my hand this 4th day of June, 1883.

MOSES G. FARMER.

Witnesses:
SARAH J. FARMER,
W. H. HARTLEY.